Dec. 8, 1953 W. V. SPURLIN 2,661,833
ARTICLE INVERTING FEEDING BOWLS
Filed March 19, 1951 2 Sheets-Sheet 2

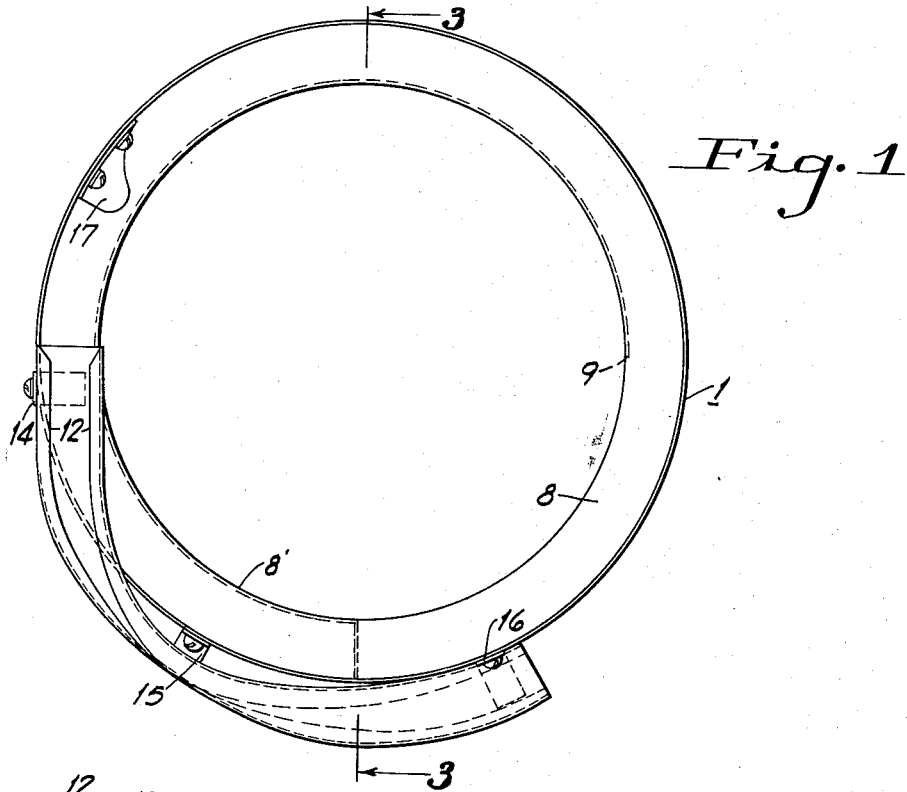
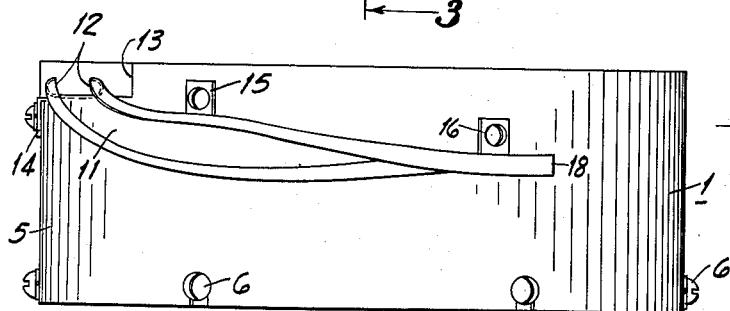
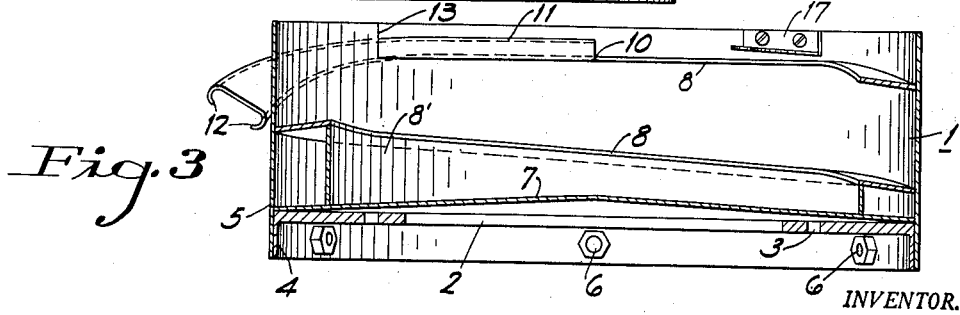

INVENTOR.
William V. Spurlin
BY
William D. Carother
His Attorney.

Patented Dec. 8, 1953

2,661,833

UNITED STATES PATENT OFFICE 2,661,833

ARTICLE INVERTING FEEDING BOWLS

William V. Spurlin, Indiana, Pa., assignor to Syntron Company, Homer City, Pa., a corporation of Delaware Application March 19, 1951, Serial No. 216,365

3 Claims. (Cl. 198—220)

This invention relates generally to article feeding bowls and more particularly to an article handling device wherein the articles are delivered in turn and are fed in series in an oriented position which is other than that in which the article is conveyed.

In the production or in the assembling of parts it is frequently desirable to supply a series of articles, each in turn and oriented to a definite or predetermined position owing to the actual shape of the article. However, the article itself is frequently not adapted for transmission in the manner in which it is desired to be fed or removed for use in the manufacture or assembly program. In such instances it is preferable to set up an article feeding bowl in such a manner that the articles will be conveyed along a helical conveyor track in a manner which is most suitable to efficiently convey that particular article and, just before the article is to be delivered for use, it is oriented by the track to a position that lends itself to the ready adaptation of the article for further work thereon or in the assembly of the article into a machine.

Another object of this invention is the provision of a feeder bowl which is arranged to receive articles in a haphazard manner and convey them in turn to form a series of articles which are then oriented to a different angular position before being delivered.

Other objects and advantages are disclosed in the following specification and claims.

The accompanying drawings show, for the purpose of exemplification without limiting the invention or claims thereto, certain practical embodiments of the invention wherein:

Fig. 1 is a plan view of a feeder bowl having a counterclockwise feeder track with an inverter comprising this invention.

Fig. 2 is a side elevation of the structure shown in Fig. 1.

Fig. 3 is a sectional view of the structure taken along the line 3—3 of Fig. 1.

Figure 4:
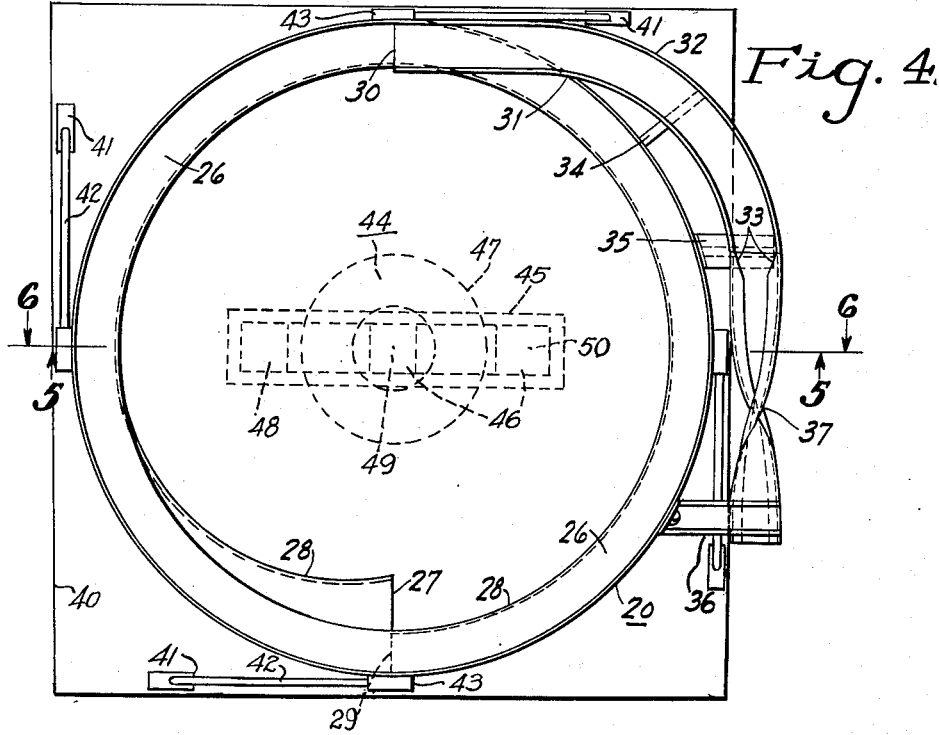
Fig. 4 is a plan view of a feeder bowl having a clockwise feeder track with an inverter comprising this invention and mounted on a reciprocating feeder motor.

Referring to Figs. 1 to 3 of the drawings the feeder bowl 1 is provided with an annular base ring 2 having a series of threaded opening holes 3 around its perimeter for the purpose of fastening the base ring 2 to a feeder motor. The base ring 2 is provided with a depending flange 4 for the purpose of receiving the annular wall 5 of the bowl which extends downwardly below the base ring 2 and to the full extent of the depending flange 4 for the purpose of providing ample room to bolt the bowl 5 to the base ring 2 by means of the bolts 6. Thus the bowl 5 is removably mounted on the base ring 2 and different forms of feeder bowls, which have different feeder conveyor tracks, may be detachably secured to the base ring 2 without removing the same from the feeder motor.

The feeder bowl 5 is provided with a bottom 7, which in this instance, is conical in shape. The wall of the bowl is provided with a helical conveyor path or track 8 which starts at 9, as indicated in Fig. 1, and travels upwardly along an inclined plane to the point 10 where a special track member 11, which is provided with inturned flanges 12, is fixed to the end of the inclined track 8 and extends through the opening 13 of the bowl 5 and is supported by the three bracket members 14, 15 and 16.

The track 11 with its inturned flanges 12 is twisted about its axis intermediate of its ends as it passes along the outside of the bowl 5 and becomes fully inverted as shown in Figs. 1 and 2. Thus the stemmed articles conveyed on this character of feeder would have a broad flange or a flat head member that could be supported by the flanges 12. An article of such shape may not provide a very good conveying surface that would ride upon the inclined track 8 and, if improperly oriented, the ejector 17 would throw it back into the bowl, but if properly oriented, would pass the ejector clip 17 and continue on the inclined helical path 8 until it entered under the inturned flanges 12 after which it proceeds outwardly and downwardly being turned over by the track 11 until it is completely upside down with the stem hanging downwardly and it will be discharged in this manner at 18. This particular conveyor track, of course, may not be suitable for other character of articles, nevertheless the track and the bowl 5 may be changed or replaced in order to provide the proper type of conveying track and ejector for the particular article which is desired to feed in turn and in an inverted position.

The inclined helical track 8 may be supported on its outer rim by the vertical wall 8' for one complete revolution or for three quarters of a revolution as the case may be. As shown in Fig. 1 the wall 8' extends for three quarters of a revolution starting at the point 9 and ending at 270° therefrom as shown in Fig. 1. The track 8 slopes downwardly immediately beyond the ejector 17 as shown in Fig. 3. This is to prevent jamming of the articles at the ejector since the slope causes the articles to feed away from the ejector faster than those approaching the ejector. The slope is initially gradual and later becomes more pronounced in the track 11, if found desirable. The slope of track 11 is dependent on the article to be conveyed.

Figure 5:
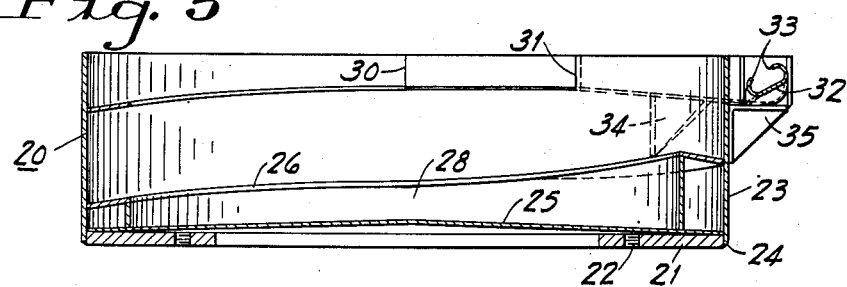
Fig. 5 is a sectional view taken along the line 5—5 of Fig. 4.
Figure 6:
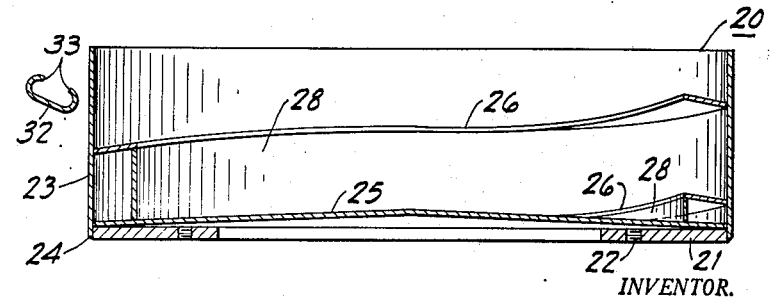
Fig. 6 is a sectional view taken along the line 6—6 of Fig. 4.

The structure as shown in Figs. 4, 5 and 6 is somewhat similar to that of Figs. 1 to 3. However, the path or conveyor track of the feeder bowl in Figs. 4, 5 and 6 moves the articles in a clockwise direction, whereas in the structure shown in Figs. 1, 2 and 3 moves the articles in a counterclockwise direction. It is obvious from the direction of the movement of the articles that the feeder motors themselves must be built to support the bowls for vibration in opposite directions for the purpose of operating these feeder bowls in the manner for which they are intended.

As shown in Figs. 4, 5 and 6 the feeder bowl 20 is mounted on the base ring 21 which is provided with the openings 22 for securing the same to a feeder motor and has the annular wall 23 extending therearound being secured to the perimetral edge of the base ring 21 as indicated at 24.

The annular wall 23 is provided with a conical bottom 25 which is likewise secured to the base ring 21 and this bowl is likewise provided with a helical conveyor track 26 which starts at 27, as indicated in Fig. 4, and has its inner marginal edge enclosed by the wall 28 which commences at the starting point 27 and extends completely around the bowl terminating at the point 27 as indicated at 29.

As the conveyor track 26 extends upwardly to the point 30 is passes through the opening 31 in the wall 23 and is provided with the exterior track member 32 which has inturned flanges as indicated at 33. These flanges do not start until after a portion of the extension track 32 has proceeded for some distance outside of the bowl. It will be noted that the track section 32 is supported by the bracket members 34, 35 and 36 and between the bracket members 35 and 36 the track section is twisted to an inverted position, as indicated at 37, and only for this extent the conveyor track need be provided with the inturned flanges 33.

The feeder motor means shown in Fig. 4 is an intermittent current impulse motor similar to that illustrated in United States Patent 2,464,216 and comprises a resiliently supported base 40 having a set of four blocks 41 mounted thereon in symmetrical relation with respect to the vertical central axis of the bowl. Each block has an upwardly sloping spring member having fastened to its upper end the blocks 43 attached to a common frame on which the bowl is mounted. An electromagnetic motor 44 is indicated in dotted lines under the bowl and is axially centered therewith. The motor comprises an armature member 45 secured to the under side of the frame and in operative spaced relation to the core 46 on which is mounted the electromagnetic field 47. This core has three pole faces 48, 49, and 50 that form the air gap with the armature 45. The attraction of the armature by the electromagnetic field causes the sloping springs to flex and the bowl follows an inclined arcuate path of movement. As soon as the current impulse subsides, the springs lift the bowl back to its original position, and thus causes the material to be conveyed upwardly along the track 26.

The bowl, as illustrated in Figs. 4, 5 and 6, has a conveyor track that is designed to handle an article somewhat similar to the article as handled by the bowl shown in Figs. 1, 2 and 3, in that the article has some sort of a hand or flange member that provides an excellent conveying surface and also serves to support the article when it is inverted.

In each instance it will be noted that the section of the conveyor track that is designed to invert the article is traveling downhill. It was found in the use of some articles, it is preferable to permit this portion of the track to slope downwardly rather than to continue the upward inclined plane of the helical path. One reason for this could be that in orienting the article, it is necessary to provide the flanges for supporting the same, and these flanges reduce the reaction surfaces for conveying the article and also the center of gravity of the article is changed relative to the conveying surface and it is thus necessary to aid the movement of the article along the track by causing it to slope downwardly. This is an important feature of this invention.

While, for clarity of explanation, certain embodiments of this invention have been shown and described it is to be understood that this invention is capable of many modifications and changes in the construction and arrangement of the many parts as described and that certain parts may be employed with the conjoint use of other parts and without departing from the spirit and scope of this invention.

I claim:

1. An article handling feeder bowl for delivering in turn each of a series of articles in a position other than that in which it is initially conveyed from the bottom of the bowl which comprises, feeder motor means for effecting reciprocation in an inclined arcuate path of movement, a bowl adapted to be secured to said feeder motor and having a bottom with an upstanding annular wall, a conveyor floor extending from the bottom of the bowl upwardly around the annular wall for feeding articles therealong when said feeder motor is energized, a discharge conveyor section having a floor portion and marginal flanges turned inwardly toward each other and having a twist therein, means to connect said discharge section directly to the upper end of the conveyor floor to continue the same along a conveying path, and means on said bowl to support said discharge section with the twist therein to position said inturned flanges to support the articles in a position other than upright as they are discharged.

2. An article handling feeder bowl for delivering in turn each of a series of articles in a position other than that in which it is initially conveyed from the bottom of the bowl which comprises, feeder motor means for effecting reciprocation in an inclined arcuate path of movement, a bowl adapted to be secured to said feeder motor and having a bottom with an upstanding annular wall, an inclined conveyor floor extending from the bottom of the bowl upwardly around the annular wall for feeding articles therealong when said feeder motor is energized, a discharge conveyor section mounted on said bowl and having a conveying surface connected directly to the upper end of the inclined conveyor floor to extend the same, said discharge section being twisted intermediate its ends to change the position of the articles conveyed therealong, and means on said discharge section to retain the articles to the end of the discharge section regardless of their angular position.

3. The structure of claim 2 characterized in that said discharge section slopes downwardly on the outside of said bowl.

WILLIAM V. SPURLIN.

References Cited in the file of this patent

UNITED STATES PATENTS

| Number | Name | Date |
|---|---|---|
| 2,346,549 | Belada | Apr. 11, 1944 |

FOREIGN PATENTS

| Number | Country | Date |
|---|---|---|
| 279,119 | Great Britain | Oct. 15, 1927 |